United States Patent Office 3,210,338
Patented Oct. 5, 1965

3,210,338
PROCESS FOR THE CONVERSION OF CYCLIC KETOXIMES
Wolfgang Huber, Norbert Petri, Siegfried Schreiner, and Karl Wintersberger, Ludwigshafen (Rhine), Germany, assignors to Badische Anilin- & Soda-Fabrik Aktiengesellschaft, Ludwigshafen (Rhine), Germany
No Drawing. Filed June 1, 1962, Ser. No. 199,248
Claims priority, application Germany, June 10, 1961, B 62,856
9 Claims. (Cl. 260—239.3)

This invention relates to the conversion of cyclic ketoximes to lactams, and more particularly to the catalytic conversion of oximes in the gaseous phase.

Several processes are already known which are concerned with the catalytic conversion of cyclic ketoximes, and more particularly of cyclohexanone oxime, to the corresponding lactams.

In these processes, the oxime vapor is led, under a pressure of 0.001 to 760 mm. mercury and at a temperature of 130° to 600° C., with or without inert carrier gases such as nitrogen, hydrogen, carbon dioxide, over catalysts which may either be stationary, or which may be continuously passed through the reaction chamber during the conversion process, or brought into fluidized motion by means of the oxime vapor or its mixture with an inert gas.

The catalysts used comprise acidic compounds including, inter alia, boric acid, phosphoric acid, or an alkali hydrogen sulfate, and in many cases these are supported by carriers such as pumice, diatomite, or aluminum oxide. In all known processes, the oxime is first vaporized in a special apparatus, and then led in the from of a vapor over the catalyst. However, decomposition of the oxime always sets in to a greater or lesser extent in the vaporizer, especially if the oxime has to be maintained for any length of time at an elevated temperature. Even when thin-film vaporizers are used or when vaporization is effected at considerably reduced pressures, cracking of the oxime cannot be completely eliminated. Apart from bringing about a reduction in yield, the decomposition compounds thereby produced render the purification of the lactam more difficult and impair the quality of the lactam polymer. Furthermore, the removal of heat liberated during the strongly exothermic reaction, particularly with large throughputs, gives rise to certain difficulties even when employing a fluidized bed.

One object of the present invention is to bring about the vapor-phase conversion of cyclic ketoximes to lactams in the presence of solid catalysts without the oxime being decomposed by heat. Another object of the invention is to provide a process for the catalytic conversion of cyclic ketoximes to lactams, in which the oxime does not have to undergo a special drying process. A further object of the invention is to provide a process for the catalytic conversion of cyclic oximes in the vapor phase to lactams, whereby a lactam practically free of oxime is obtained. A still further object of the invention is to provide a process for the production of lactams which are easily purified and which can be polymerized to a qualitatively highly valuable polylactam. A final object of the invention is to provide a process in which the heat of reaction generated by the catalytic conversion of cyclic oximes in the vapor phase can be readily controlled.

These and other objects are achieved when oximes of cycloaliphatic ketones are brought, in the form of a liquid, into contact with acid-containing catalysts supported on inert carriers and maintained at a temperature of from 210° to 450° C.

The process can, it is true, be operated with a stationary catalyst, but it is particularly advantageous to employ the catalyst in the form of a fluidized bed.

In comparison with the processes already known, the new process is characterized in that a separate vaporizer is no longer required. Furthermore, the heat required for vaporizing the oxime is supplied in full by the heat of reaction generated during conversion.

The process can be used for converting cycloalkanone oximes containing, for example, from 5 to 12 carbon atoms. Examples of suitable cycloalkanone oximes are cyclopentanone oxime, cyclohexanone oxime, methylcyclopentanone oxime, methylcyclohexanone oxime, cyclooctanone oxime and cyclododecanone oxime. The oximes can be employed in the anhydrous state. It is, however, of advantage to employ an oxime containing a certain amount of water, e.g., up to about 15 percent by weight water, i.e., the amount that the oxime contains when manufactured from ketones and hydroxylamine salts.

With reference to the acid catalysts, the following substances can be used with advantage: phosphoric acid, boric acid or alkali hydrogen sulfates, eg., lithium, sodium or potassium hydrogen sulfate or mixtures of these compounds. The catalysts can be used in their original form, but they can also be supported on carriers which are inert to the conversion process. Suitable carriers include, for example, oxides of those elements of the 3rd and 4th groups of the periodic system which have an atomic weight of over 25, e.g., oxides or aluminum, silicon, tin or titanium. Examples of these are the various forms of aluminum oxide such as alumina, Bayerite and corundum; silica gel and diatomaceous earth; and tin dioxide and titanium dioxide. Pumice, activated charcoal or zinc oxide may also be used as carriers.

The ratio of acid catalyst to its carrier can be varied to a comparatively large extent. In general, it lies between 1:100 and 1:0.25. With the preferred carrier-supported catalysts, the proportion of acid catalyst amounts to from 5 to 60 percent by weight of the combined catalyst and carrier.

The method adopted for the manufacture of these catalysts is well-known. The catalyst and carrier are made up to a paste with a little water, mixed on a mill, and extruded as rods or pellets; the product is dried for 24 hours at 120° C. and then heated for 6 hours at from 400° to 800° C.

Pellets, cylinders, rods or some other geometric form is used, depending on the manner in which the catalyst is used in the process. Where the catalyst is held in a stationary position, use can be made either of particles with diameters ranging from 1 to 5 mm., or of tubes coated with catalysts, or carriers of reticular construction. In the preferred fluidized-bed process, the catalyst particles have diameters of from 0.005 to 1.0 mm., or preferably, of from 0.03 to 0.6 mm.

The conversion is carried out at temperatures lying between 210° and 450° C., and usually under a normal or reduced pressure. Where the conversion is effected under reduced pressure, pressures ranging between 20 and 500 mm. Hg are preferred. The process can, however, also be carried out under superatmospheric pressure, e.g., at 2 or 5 atmosphere gage or at even higher pressures. Inert gases, e.g., carbon dioxide, argon, nitrogen or water vapor may also be employed in the process. This is of particular advantage when using a fluidized-bed, since the catalyst can be put into motion by first passing suitably pre-heated inert gas.

In carrying out the process in accordance with the invention, the catalyst is first heated to between 210° and 450° C., where necessary under reduced pressure, and the oxime is brought as a liquid, i.e., at a temperature at which it is still not vaporized, into contact with the catalyst. Where the catalyst is stationary, the liquid oxime may, for example, either be uniformly distributed within the lower half of the layer, or fed to the underside of the layer by means of a plurality of nozzles. When the liquid oxime comes into contact with the hot catalyst, it is immediately vaporized and the conversion reaction occurs. Since it is difficult to obtain a uniform temperature distribution with a stationary catalyst, particularly in larger plants, the use of a fluidized bed is much preferred. In this case, the liquid oxime is best sprayed on to the underside of the heated, loosely packed catalyst. The vaporizing oxime brings the catalyst into fluidized motion, and the conversion process begins. The heat liberated by the reaction is quite sufficient to bring about further vaporization of the oxime. As a rule, therefore, no further heating of the catalyst is necessary; it is, in fact, frequently necessary to provide cooling to prevent overheating. A fluidized layer can also be produced by blowing in inert gases or vapors, e.g., nitrogen or water-vapor; these may be cold but preferably they should be heated to from 100° to 400° C. The liquid oxime can then be introduced a a spray into the fluidized bed either from below or from the side, e.g., by means of a single-channel spray-producing nozzle through which passes only one substance, viz., the oxime, or by means of a dual, concentric-channel nozzle through which two substances, viz., both the oxime and inert gas or vapor, are passed, the said gas or vapor acting as the impelling and spray-producing medium. The aspect of major importance is that the oxime should impinge as a liquid on the hot catalyst.

The vapors and gases emerging from the reaction chamber should be led through a cyclone where any catalyst particles carried over can be separated out. The vapors should then be fractionated, e.g., at a first stage of 60° to 80° C. where the greater part of the lactam condenses out, and then at a second stage of about 20° C. where the residual lactam can be washed out, e.g., by a spray of water, and cooled. Non-condensable gases, e.g., inert gases, can be recycled into the fluidized layer.

The depth of the catalyst layer should be so selected that the residence time of the oxime in the fluidized bed lies between 0.01 and 20 seconds, preferably between 0.1 and 3 seconds. Too brief a residence time brings with it incomplete conversion while too long a residence time promotes the formation of undesirable by-products.

The temperature employed during conversion lies between 290° and 400° C., depending on the oxime employed, and lies more particularly in the region of 350° C. At lower temperatures, not all the oxime is converted, while at higher temperatures the quantity of by-products formed is increased.

Since the catalysts become exhausted after some time and have, in consequence, to be regenerated, e.g., by heating in a current of air at 700° to 900° C., a regeneration period can be introduced from time to time, or in the case of the fluidized-bed process, the catalyst can be continuously replaced by fresh or regenerated material, and an appropriate quantity of catalyst with the reaction zone can be allowed to overflow through an outlet located at a suitable height in the reaction vessel, whereupon it can be subjected to an externally conducted regeneration process.

This new process produces a lactam in which there are only very small quantities, i.e., less than 1 percent, of oxime and by-products such as nitriles. The product can readily be purified by the usual methods, e.g., by distillation under reduced pressure, where necessary with the addition of oleum, followed by a treatment with potassium permanganate, filtration, and a final distillation.

*Example 1*

600 grams of a catalyst consisting of a mixture made up of equal quantities of aluminum oxide and boron oxide, which has been previously heated to 800° C., and which has a particle size of 0.3 to 0.5 mm., are placed in a vertically arranged, electrically heated tube having a sintered glass base, and being 100 cm. in height and 100 mm. in diameter. The catalyst is heated to 320° C., and fluidized by passing a stream of nitrogen, heated to 300° C., at a rate of 2,000 liters per hour upwards through the sintered glass. After the reaction temperature has been attained, and the pressure within the tube adjusted to 0.5 atmosphere, 1,170 grams liquid cyclohexanone oxime with a moisture content of 4.8 percent by weight is supplied from a storage vessel maintained at a temperature of 95° C., and injected in the course of 1 hour into the fluidized catalyst bed through the upwardly directed, dual-channel nozzle, already described, located centrally in the tube, 90 mm. above the sintered glass base, a stream of nitrogen heated to 200° C. and flowing at a rate of 350 liters per hour being the impelling medium. During this time, the temperature of the fluidized bed is continuously controlled and maintained at 320° to 325° C. by appropriately adjusting the electric heater. The vapors issuing from the reaction chamber are condensed in a cooling system maintained at 70° C. with water. The product obtained as a result of this reaction provides 999 grams ε-caprolactam upon distillation, an amount corresponding to an 89.6 percent yield referred to anhydrous cyclohexanone oxime.

*Example 2*

On using the same apparatus and the same quantity of catalyst as described in Example 1, the said catalyst is heated to 280° C. and fluidized by passing a stream of nitrogen, heated to 250° C., at a rate of 1,880 liters per hour upwards through the sintered glass base. After the reaction temperature has been attained the pressure within the tube adjusted to 0.5 atmosphere, 515 grams liquid cyclo-octanone oxime with a moisture content of 0.06 percent is supplied from a storage vessel maintained at a temperature of 70° C., and injected in the course of 78 minutes into the fluidized catalyst bed through the dual-channel nozzle located centrally in the tube, 90 mm. above the sintered glass base, a stream of nitrogen heated to 200° C. and flowing at a rate of 350 liters per hour at a pressure of 0.5 atmospheres gage being the impelling medium. During this time, the temperature of the fluidized bed is maintained at 280° to 300° C. by appropriately adjusting the electric heater. The gases issuing from the reaction chamber are cooled and the condensed reaction product yields 332 grams capryllactam, an amount corresponding to a 64.5 percent theoretical yield referred to cyclooctanone oxime.

*Example 3*

1,200 grams of the catalyst described in Example 1 are placed in a vertically arranged, electrically heated tube having a sintered glass base, and being 1,400 mm. in length and 100 mm. in diameter, and in which a dual-channel nozzle protrudes vertically and centrally 50 mm. into the catalyst bed. The catalyst is heated to 370° C. and is fluidized by passing a stream of nitrogen heated to 330° C. and flowing at a rate of 600 standard liters per hour through the sintered glass base; the pressure in the tube lies between 200 and 500 mm. Hg. After the reaction temperature has been attained and the pressure within the tube adjusted to 400 mm. Hg., 4.3 kg. methylcyclohexanone oxime, with a moisture content of 8.5 percent by weight and heated to 100° C., is injected over a period of 74 minutes into the fluidized catalyst bed through the dual-channel nozzle, a stream of nitrogen heated to 140° C. and flowing at a rate of 545 liters per hour being the impelling medium. During the course of the conversion, 1,400 grams unheated fresh catalyst is fed to the fluidized bed by means of a rotary dispensing disc located at the top of the tube, and a corresponding quantity of used catalyst leaves the bed by means of an overflow pipe, so that the height of the bed remains constant. The temperature of the catalyst layer is maintained at 370° to 380° C. The vapors issuing from the reaction chamber are condensed in a cooling system maintained at 50° C. with water. The reaction product obtained provides 3,338 grams methylcaprolactam after distillation, an amount corresponding to 87.3 percent yield referred to anhydrous methylcyclohexanone oxime.

*Example 4*

1,400 grams of the catalyst described in Example 1 are heated to 370° C. in the apparatus described in Example 3, and fluidized by means of a stream of nitrogen, heated to 350° C. and flowing at a rate of 420 liters per hour, the pressure in the tube lying between 200 and 500 mm. Hg. When the reaction temperature of 370° to 380° C. has been attained and a pressure of 400 mm. Hg established in the tube, 36.4 kg. cyclohexanone oxime with a moisture content of 5.8 percent and heated to 100 C., is injected in the course of 187 minutes into the fluidized catalyst bed through the dual-channel nozzle; nitrogen under 2 atmospheres, heated to a temperature of 250° C. and flowing at a rate of 650 liters per hour provides the impelling medium. 11.7 kg. catalyst is passed through the reaction zone during the conversion process in a manner similar to that described in Example 3. The vapors issuing from the reaction chamber are condensed and, after distillation, give 31.86 kg. caprolactam, that is, a yield of 92.7 percent referred to anhydrous cyclohexanone oxime.

*Example 5*

A vertically arranged, electrically heated tube of 1,400 mm. in length and 100 mm. in diameter, tapers conically to a diameter of 20 mm. at its lower end. A dual-channel nozzle is introduced into the narrow section in such a way that its tip projects only about 5 mm. into the tube. 1,000 grams of the catalyst mentioned in Example 1 are placed in this tube and heated to 360° C. while simultaneously fluidized by passing a stream of nitrogen, pre-heated to 320° C. and flowing at a rate of 475 liters per hour, through the nozzle at 0.5 atmosphere gage pressure, the pressure in the tube lying between 200 and 500 mm. Hg. After the reaction temperature of 360° to 380° C. has been attained, and the pressure of 310 mm. Hg has been established in the tube. 17 kg. cyclohexanone oxime with a moisture content of 5.2 percent and heated to a temperature of 100° C., is injected in the course of 2 hours into the fluidized catalyst bed through the dual-channel nozzle, a stream of nitrogen heated to 320° C. and flowing at a rate of 475 liters per hour at a pressure of 0.5 atmosphere gage, being the impelling medium. 5.3 kg. of catalyst are passed through the reaction tube during the conversion process in a manner similar to that described in Example 3. The vapors issuing from the reaction zone produce 15.37 kg. caprolactam after condensation and distillation, that is, a 95 percent yield referred to anhydrous cyclohexanone oxime.

*Example 6*

A single-channel nozzle surrounded by an annular aperture is introduced into a reaction tube of the type described in Example 5, so that its tip protrudes only about 5 mm. into the tube. 500 grams of the catalyst described in Example 1 are placed in the tube, and while heating to 360° C. it is fluidized by passing in nitrogen, heated to 300° C., under a pressure between 200 and 500 mm. Hg, at a rate of 200 liters per hour through the annular aperture surrounding the nozzle, the pressure in the tube being between 200 and 500 mm. Hg. After the reaction temperature has been attained and a pressure of 95 mm. has been established, 1.8 kg. cyclohexanone oxime, with a moisture content of 6.4 percent and a temperature of 100° C., are injected over a period of 40 minutes into the catalyst layer, by means of a twin-piston pump at 20 atmospheres. As soon as some of the oxime has vaporized in the fluidized bed, the nitrogen used to initiate fluidization of the catalyst layer is shut off, so that the oxime vapor is alone responsible for fluidizing the catalyst. During conversion, 500 grams catalyst are passed through the reaction zone in the manner described in Example 3. The temperature of the fluidized bed is maintatined at 360° to 370° C. After condensation and distillation of the vapors issuing from the reaction tube, 1.3 kg. caprolactam are obtained, that is, a yield of 76.5 percent referred to anhydrous cyclohexanone oxime.

*Example 7*

1,800 grams catalyst are placed in the apparatus described in Example 3, this catalyst consisting of a mixture of 80 percent titanium dioxide and 20 percent boron oxide which has previously been heated to 800° C., the particle size being 0.3 to 0.5 mm. The catalyst is heated to 360° C. whilst being simultaneously fluidized by passing nitrogen, pre-heated to 335° C., at a rate of 600 liters per hour through the sintered glass base, the pressure in the tube being between 200 and 500 mm. When the reaction temperature of 360° to 370° C. has been attained and a pressure of 405 mm. Hg established in the reaction tube, 18.7 kg. cyclohexanone oxime with a moisture content of 4.8 percent at a temperature of 100° C., are injected over a period of 2 hours into the fluidized catalyst layer through the dual-channel nozzle, a stream of nitrogen heated to 140° C. and flowing at a rate of 500 liters per hour under a pressure of 2 atmospheres gage being the impelling medium. 11 kg. catalyst are passed through the reaction zone during the conversion process in a manner similar to that described in Example 3. The vapors issuing from the reaction chamber are condensed, and after distillation provide 16.4 kg. caprolactam, that is, a yield of 92.2 percent referred to anhydrous cyclohexanone oxime.

*Example 8*

1,200 g. of the catalyst described in Example 1 are placed in the apparatus described in Example 3, and are heated to 360° C. whilst being simultaneously fluidized by passing nitrogen, pre-heated to 380° C., at a rate of 570 liters per hour through the sintered glass base, the pressure in the tube being between 200 and 500 mm. Hg. After the reaction temperature of 360° to 370° C. has been attained, and a pressure of 260 mm. of mercury has been established in the reaction tube, 12.4 kg. cyclohexanone oxime with a moisture content of 4.8 percent and a temperature of 100° C., are injected over a period of 145 minutes into the fluidized catalyst layer through a dual-feed nozzle, water vapor, pre-heated to 140° C. and flowing at a rate of 530 liters per hour under a pressure of 2 atmospheres gage, being the impelling medium. During conversion, 4 kg. catalyst are passed through the reaction zone in the manner described in Example 3. The vapors issuing from the reaction chamber are condensed in a cooling system maintained at 50° C. with water, and after distillation, 10.7 kg. caprolactam are obtained, that is, a yield of 90.8 percent on the weight of anhydrous cyclohexanone oxime.

*Example 9*

100 g. catalyst comprising cylindrical shapes, 3.0 mm. in diameter and 10 to 20 mm. in length, and consisting of 27 percent boric acid on zinc oxide, are placed in a vertically arranged, electrically heated tube, 1,000 mm. in height and 22 mm. in diameter, and which is made narrower at the base by means of baffles. After the catalyst has attained a reaction temperature of 345° to 350° C., and after a pressure of 40 mm. Hg has been established in the reaction tube, 100 grams cyclohexanone oxime, with a moisture content of about 0.08 percent, are sprayed from above on to the catalyst over a period of 1 hour. The vapors withdrawn of the base of the reaction tube are condensed, and after distillation 90.6 grams caprolactam are obtained, equivalent to a 90.5 percent theoretical yield.

Example 10

100 grams catalyst, with dimensions similar to those given in Example 9 but consisting of 25 percent boron oxide and 75 percent zinc oxide, are placed in the apparatus described in Example 9 and heated to 350° C. After establishing a pressure of 40 mm. Hg in the tube, 100 grams anhydrous cyclohexanone oxime are sprayed over a period of 1 hour on to the catalyst; during this time the temperature rises slowly to 360° C. After condensation and distillation, the vapors recovered from the base of the reaction tube produce 86.5 percent caprolactam, that is, an 86.5 grams of theoretical yield.

Example 11

100 grams catalyst, with dimensions similar to those given in Example 9, but consisting of 40 percent boron oxide and 60 percent aluminum oxide, are placed in the apparatus described in Example 9, and heated to 210° C. After establishing a pressure of 200 mm. Hg within the tube, 100 grams anhydrous cyclohexanone oxime are sprayed on to the catalyst over a period of 1 hour; during this time the temperature rises to 225° C. After condensation and distillation of the vapors recovered from the base of the reaction tube, 68.2 grams caprolactam are produced, corresponding to a yield of 68.2 percent theory.

Example 12

100 grams of the catalyst described in Example 11 are placed in the apparatus described in Example 9 and heated to 260° C. of 105 grams cyclohexanone oxime, having a moisture content of 5 percent, is sprayed on the catalyst for a period of 1 hour, the pressure in the tube being 40 mm. Hg. The temperature rises to 282° C. during the process. The vapors withdrawn from the reaction tube produce, after condensation and distillation, 90 grams caprolactam, equivalent to a yield of 90 percent theory referred to anhydrous cyclohexanone oxime.

Example 13

200 cc. (162 grams) of the catalyst of the same particle size of that described in Example 9 but consisting of 20 percent boron oxide and 80 percent titanium dioxide, are placed in the apparatus described in Example 9, and heated to 260° C. On adjusting the pressure in the tube to 40 mm. Hg, 524 grams cyclohexanone oxime, having a moisture content of 6 percent, are sprayed on to the catalyst over a period of 5 hours; the temperature rises to 270° to 300° C. The vapors withdrawn from the reaction tube are condensed and distilled, 379 grams caprolactam being thus obtained, that is, a 94.3 percent theoretical yield referred to anhydrous cyclohexanone oxime.

Example 14

160 cc. (127 grams) of a catalyst of similar particle size of that in Example 9 and consisting of 15 percent boron oxide and 85 percent tin dioxide, are placed in the apparatus described in Example 9, and heated to 260° C.; on adjusting the pressure in the tube to 40 mm. Hg, 106 grams cyclohexanone oxime having a moisture content of 6 percent, is sprayed on to the catalyst over a period of 1 hour. Heat is applied and the temperature rises slowly to 347° C. The vapors recovered from the reaction tube are condensed and distilled to give 96 grams caprolactam, that is, a yield of 96 percent theory referred to the anhydrous cyclohexanone oxime.

Example 15

100 g. of a sintered boron oxide, comminuted to a particle size of about 8 mm. diameter, is placed in the apparatus described in Example 9 and heated to 250° C. After establishing a pressure of 40 mm. Hg, 84 grams anhydrous cyclohexanone oxime is sprayed on the catalyst over a period of 1 hour. On distillation of the condensed reaction product, 56.5 grams unchanged oxime and 21 grams caprolactam are obtained; this is equivalent to a yield of 76.3% on the cyclohexanone oxime reacted.

Example 16

1,800 grams anhydrous potassium hydrogen sulfate, with a particle size 0.15 to 0.5 mm., is placed in the apparatus described in Example 3 and heated to 160° C. while being brought simultaneously to a fluidized state by passing a stream of nitrogen, heated to 160° C., at a rate of 600 liters per hour, through the sintered glass base, the pressure in the tube being adjusted to 50 mm. Hg. On attaining a temperature of 160° to 170° C. and establishing a pressure of about 50 mm. Hg in the reaction tube, 400 grams anhydrous cyclohexanone oxime, heated to 110° C., is injected, over a period of 32 minutes, through the dual-channel nozzle into the fluidized catalyst layer, nitrogen heated to 140° C., under a pressure of 2 atmospheres, and flowing at a rate of 400 liters per hour, being the impelling medium; during this process the rate of flow of nitrogen through the sintered glass base is reduced to 200 liters per hour. The vapors emerging from the reaction vessel are condensed yielding 223 grams unchanged oxime and 66 grams caprolactam; this is equivalent to a yield of 37.3 percent on the cyclohexanone oxime reacted.

Example 17

1,200 grams catalyst comprising a mixture of 20 percent phosphoric acid and 80 percent silica, tempered at 250° C. and having a particle size of 0.2 to 0.4 mm., is placed in the apparatus described in Example 3 and heated to 300° C., while being brought to a fluidized state by passing nitrogen heated to 300° C. through the sintered glass base at a rate of 330 liters per hour; the pressure in the tube is about 250 mm. Hg. After a temperature of 300° to 310° C. has been attained and the pressure in the tube adjusted to 320 mm. Hg, 3.2 kg. cyclohexanone oxime with a moisture content of 5.8 percent and heated to 100° C. is injected, over a period of 112 minutes, through the dual-channel nozzle into the fluidized catalyst bed, nitrogen heated to 140° C. and flowing at a rate of 450 liters per hour under a pressure of 2 atmospheres, being the impelling medium. As in Example 3, 1.2 kg. catalyst is passed through the reaction tube during conversion. The vapors leaving the reaction zone are condensed and, upon distillation, yield 275 grams unchanged oxime and 1,463 grams caprolactam, equivalent to a yield of 60.6 percent on the anhydrous cyclohexanone oxime.

We claim:

1. A process for the production of lactams which comprises heating to a temperature of from 210° C. to 450° C. solid particles of a catalyst selected from the group consisting of phosphoric acid, boric acid, boron oxide, and mixtures thereof, and thereafter contacting said catalyst particles with a liquid cycloalkanone oxime having 5 to 12 carbon atoms, whereby the oxime is impinged as a liquid on the hot catalyst particles.

2. The process of claim 1 wherein said catalyst is used on a carrier.

3. The process of claim 1 wherein the catalyst is in the form of a fluidized bed and whereby the particles of catalyst are heated to a temperature of from 390° C. to 400° C.

4. The process of claim 1 wherein a cycloalkanone oxime is used which contains up to 15% by weight of water.

5. The process of claim 1 wherein the process is carried out in the presence of inert gases.

6. A process for the production of lactams which comprises heating to a temperature of from 210° C. to 450° C. catalyst particles on a carrier, said catalyst being selected from the group consisting of phosphoric acid, boric acid, boron oxide, and mixtures thereof, and thereafter contacting said catalyst particles in a fluidized state with a liquid cycloalkanone oxime having 5 to 12 carbon atoms, whereby the oxime is impinged as a liquid on the hot catalyst particles.

7. A process as in claim 6 wherein the fluidized state of the catalyst is produced by an inert gas.

8. A process for the production of caprolactam which comprises heating catalyst particles on a carrier to a temperature of 210° C. to 450° C. said catalyst being selected from the group consisting of phosphoric acid, boric acid, boron oxide, and mixtures thereof, and thereafter contacting said catalyst particles in a fluidized state with liquid cyclohexanone oxime, whereby the said cyclohexanone oxime is impinged as a liquid on the hot catalyst particles.

9. The process of claim 8 wherein the fluidized state of the catalyst is produced by an inert gas.

References Cited by the Examiner

UNITED STATES PATENTS 2,234,566  3/41  Lazier _____ 260—239.3

FOREIGN PATENTS 1,055,537  4/59  Germany.
881,276  11/61  Great Britain.
881,927  11/61  Great Britain.

OTHER REFERENCES

Gould: "Mechanism and Structure in Organic Chemistry," pp. 618–20 (Holt-Dryden) (1959).

Promotionsarbeit No. 3088, Swiss Federal Technical Institute, (1961), p. 11.

WALTER A. MODANCE, *Primary Examiner.*

IRVING MARCUS, *Examiner.*